US007247320B2

(12) United States Patent
Jost

(10) Patent No.: US 7,247,320 B2
(45) Date of Patent: Jul. 24, 2007

(54) SHELF STABLE NUTRITIONAL COMPOSITION CONTAINING INTACT WHEY PROTEIN, PROCESS OF MANUFACTURE AND USE

(75) Inventor: Rolf Jost, Bolligen (CH)

(73) Assignee: Nestec S.A., Vevey (CH)

( * ) Notice: Subject to any disclaimer, the term of this patent is extended or adjusted under 35 U.S.C. 154(b) by 603 days.

(21) Appl. No.: 10/245,363

(22) Filed: Sep. 18, 2002

(65) Prior Publication Data

US 2003/0099761 A1   May 29, 2003

(30) Foreign Application Priority Data

Nov. 26, 2001   (EP)   ................................. 01128025

(51) Int. Cl.
*A23C 21/06* (2006.01)
*A23C 21/00* (2006.01)
*A01J 25/11* (2006.01)

(52) U.S. Cl. ........................ 424/535; 424/520; 426/583
(58) Field of Classification Search ..................... None
See application file for complete search history.

(56) References Cited

U.S. PATENT DOCUMENTS

| | | | | |
|---|---|---|---|---|
| 4,112,123 | A | | 9/1978 | Roberts .......................... 426/72 |
| 4,303,692 | A | * | 12/1981 | Gaull ........................... 426/580 |
| 4,614,653 | A | * | 9/1986 | Kakade ........................... 426/2 |
| 4,748,034 | A | * | 5/1988 | de Rham .................. 426/330.2 |
| 5,520,948 | A | * | 5/1996 | Kvamme ..................... 426/590 |
| 5,571,783 | A | * | 11/1996 | Montagne et al. .............. 514/2 |
| 5,670,344 | A | * | 9/1997 | Mehansho et al. ............. 426/74 |
| 5,985,339 | A | * | 11/1999 | Kamarei ....................... 426/72 |
| 6,051,236 | A | * | 4/2000 | Portman ...................... 424/725 |
| 6,194,009 | B1 | | 2/2001 | Kamarel ....................... 426/72 |
| 6,592,863 | B2 | * | 7/2003 | Fuchs et al. ................ 424/93.1 |

FOREIGN PATENT DOCUMENTS

| | | | |
|---|---|---|---|
| EP | 0 486 425 | A1 | 5/1992 |
| EP | 865735 | A1 * | 9/1998 |
| WO | WO 99/56563 | | 11/1999 |
| WO | WO 01/22837 | A1 | 4/2001 |

OTHER PUBLICATIONS

FDA/CFSAN: Approximate pH of Foods and Food Products, Updated Jul. 3, 2000. [internet document] <http://webarchive.org/web/20011120201944/http://www.cfsan.fda.gov/~comm/lacf-phs.html> 11 pages.*
"Ambient" MS Encarta World English Dictionary, North American edition ©2005, [internet document] accessed Sep. 14, 2005 <http://encarta.msn.com/encnet/features/dictionary/DictionaryResults.aspx?refid=1861585052>. 1 page.*
"Methoxy MealTM" Nutritional Supplement Facts. Power Supplements.com. web document <http://web.archive.org/web/20010801151546/http://www.powersupplements.com/methoxymeal.htm> accessed Apr. 11, 2006, published Aug. 11, 2001 2 pages.*
"Methoxy MealTM" Nutritional Supplement Facts. Power Supplements.com. web document <http://web.archive.org/web/20010815061936/powersupplements.com/methoxy3.jpg> accessed Apr. 11, 2006, published Aug. 11, 2001 1 page.*
Muscular Enhancement Newsletter. Mar. 1997. 11 pages.*
J. Ksiazyk, et al. J. Pediatr. Gastroenterol. Nutr. (2002) 35(5), pp. 615-618.*
J. Dryer. "All juiced up- ready-to-drink sales trends" Dairy Foods. Jan. 1994. 2 pages.*

* cited by examiner

*Primary Examiner*—Cecilia J. Tsang
*Assistant Examiner*—Andrew D Kosar
(74) *Attorney, Agent, or Firm*—Bell, Boyd & Lloyd LLP

(57) ABSTRACT

A composition is provided that provides a nutritionally complete calorically dense formula suitable for use as a ready-to-use liquid composition that does not require reconstitution and admixing, which contains intact whey protein in high concentration and which is shelf stable for up to 6 months or more at ambient temperature.

12 Claims, No Drawings

SHELF STABLE NUTRITIONAL COMPOSITION CONTAINING INTACT WHEY PROTEIN, PROCESS OF MANUFACTURE AND USE

TECHNICAL FIELD OF THE INVENTION

This invention relates to a nutritional composition that contains high levels of intact, i.e., non-hydrolysed whey protein as protein source.

BACKGROUND OF THE INVENTION

Liquid formulas, in particular for enteral nutrition, contain protein in a concentration ranging from 2 to 6%. Most of these type products have 3 to 4% (30-40 g/l) of protein, and more rarely contain protein concentrations of >50 g/l to 80 g/l. If the existing products are reviewed with respect to their protein source, it appears that most formulas were based on casein (Ca—, Na— or K-caseinate), and more recently also on milk protein concentrate (MPC).

At present, liquid shelf stable formulas based on intact whey protein are practically non-existant. This is related to the pronounced heat lability of whey protein in sterilizing heat treatments, a problem not experienced when casein is used as a protein source.

In consideration of the high nutritional protein quality (balanced aminogramme) of whey protein, the use of this protein source in enteral nutrition formulas appears very desirable. Due to heat induced gelling or sedimentation, however, it has not been possible so far to incorporate into suhc formulas markedly higher concentrations of whey protein than e.g. that present in commercial milk protein concentrates (milk protein concentrate whey proteins constitute about 20% of the total protein). Sterilizing heat treatments such as those required for bacteriological safety and non-refrigerated storage lead to denaturation of the protein, followed by aggregation, sediment formation or gelling of the protein in the formula.

A known solution to this stability problem is the partial hydrolysis of whey protein by proteases, prior to the introduction of the material into a composition that is subjected to sterilizing heat treatments.

An example of a commercial enteral formula containing 40 g/l of partially hydrolysed whey protein is known as PEPTAMEN®. In this product, the protein has been partially hydrolysed by trypsin and thereby rendered stable to sterilizing heat treatment. It is also possible to combine whey protein hydrolysates with casein hydrolysates or cascinates to compose the protein basis of a formula. An example of such an approach is disclosed in U.S. Pat. No. 5,821,217 (an enteral formula containing protein hydrolysates) or in U.S. Pat. No. 5,549,905 (a pediatric patients formula containing 12% of the calories in form of hydrolysed whey protein).

Although the use of partially hydrolysed (whey) protein is a possible approach, an inherent disadvantage of this solution is the bitter taste resulting from the incorporation of partially hydrolysed protein into such formulas. While bitter taste is not a significant problem in a tube feeding mode, it becomes a serious problem in a formula intended for oral consumption.

In order to produce a bland tasting whey protein based enteral formulas with long non-refrigerated shelf life, approaches other than hydrolysis must be found to stabilize the protein or else the formula will not be palatable.

Two recent developments seem to go in this direction, but they do not achieve the goal of sterility and long shelf life which exploit the known acid stability of whey protein. EP 0 486 425 teaches the production of a whey protein based formula (at least 60% whey protein) which as a pH between 3.5 and 3.9. The low pH of the formula was obtained by the addition of citric and phosphoric acid. The formula received a pasteurizing heat treatment: at 95.6° C. for 4.3 s. In WO 99/56563, a low pH enteral formula is described in which highly methoxylated pectin (0.6-1.25%) is used as a protein stabilizer. One particular variant of this formula contains intact whey protein as a protein source; the final pH of the formula is 4.0-4.35 and the heat treatment applied to the formula is 102-104° C. for 18 s.

Both these disclosures are first steps towards a successful incorporation of intact whey protein into liquid enteral nutrition formulas, but they both have the decisive shortcoming of being unable to deliver shelf-stable products. This is evident if one looks at the heat treatments being used. Both heat treatments provide sufficient killing of vegetative non-spore forming bacteria but cannot inactivate spore formers to any sufficient extent. In order to inactivate e.g. spores of B.cereus, heat treatments well above 105° C. are required. B.cereus has a known D-value in the range of 40-100 s at an acid pH. The heat treatment given e.g. in WO 99/56563 (102-104° C./18 s) will provide less than one log of inactivation. With a treatment at 130° C., and $D_{130}$=0.1 s, close to 10 logs of inactivation per second of holding time are achieved for the same organism. For thermophilic spore formers such as B. steatiothermophilsu, B. coagulans or B. circulans, D-values are >100 s at an acid pH. It is therefore clear that heat treatments such as used in both documents cannot lead to commercial sterility or to a satisfactory non-refrigerated shelf life.

A further disadvantage of the processes described in these two documents is doubtless the strongly sour taste of the products, which also limits the flavoring possibilities and by this also narrows acceptance by the consumer.

A third shortcoming of the approach described in these two documents is the fact that with a pH of the formula in a range of 3 to 4.6, no casein can be included in the formula, as under these conditions, casein is precipitated or forms a gel. This excludes the production of liquid formulas with combinations of whey protein and casein.

According to the teachings of the prior art so far, there is no solution to the problem of producing a commercially sterile, shelf-stable liquid formula, with a neutral pH and based exclusively or to its major part, on intact (unhydrolysed) whey protein. The present invention now provides one solution to this problem.

SUMMARY OF THE INVENTION

The present invention now makes it possible to sterilize whey protein solutions at a high protein concentration (up to 10%) and in presence of high concentrations of carbohydrates, sucrose and/or malto-dextrins.

Thus, the invention provides a shelf stable liquid nutritional composition having a protein content ranging from about 20 to 90 g/l and preferably 30 to 60 g/l and in which a majority of the proteins therein are composed of whey protein in intact, unhydrolysed form. In these compositions, at least about 60% to as much as 90% or more of the proteins therein are composed of whey protein in intact, unhydrolysed form. These compositions have a pH at ambient temperature of between 6 and 8 and preferably between 6.5 to 7. Advantageously, the composition also contains calcium in a concentration between 300 and 1200 mg/l. It can also contain carbohydrates and demulsified dietetic oils so that it has an energy density of between 1 and 2 kcal/ml.

The invention also relates to a process for the production of an intact whey protein composition which comprises:

adjusting an acid phase composed of whey protein and carbohydrates to a pH of 2.5 to 3.5 and subsequently UHT-sterilizing it, neutralizing the sterilized acid phase with a soluble base to raise the pH aseptically to at least 6.5 at a temperature of 5 to 15° C., separately UHT-sterilizing a fat phase in form of a stable oil in water emulsion having a pH of between 6.5 and 7.5, which pH is mesured at ambient temperature and in which the fat phase contains any minerals, trace elements or vitamins for the formula, and aseptically combining the two separately sterilized phases in a sterile tank and aseptically filling the mixture into a suitable package, wherein filling takes place in an aseptic environment. In this process, sterilization is performed by either direct or indirect UHT-heating, preferably at a temperature in the range of 135 to 150° C., and it is preferred for the two separately sterilized phases to be aseptically mixed in-line.

Other aspects of the invention include methods for preparing oral or enteral nutrition formulations by including therein one of the shelf stable liquid nutritional compositions described herein.

The invention also relates to a method for providing nutrition to a patient which comprises administering to a patient in need of such nutrition a shelf stable ready-to-use composition as decribed herein. Preferably, the composition is administered through a naso-gastric feeding tube and in an amount sufficient to provide complete nutritional support for the patient.

DETAILED DESCRIPTION OF THE PREFERRED EMBODIMENTS

A first important condition to achieve the desired product without causing any protein aggregation is to adjust the pH of the protein/carbohydrate solution to the rnage of 2.5 to 3.5 with an acid, preferably a mineral acid, prior to heat treatment.

A second importent element is an aseptic neutralization with a sterile soluble base to raise the pH of the heat sterilized protein/carbohydrate solution to a value between 6.5 and 7.5 (at ambient temperature). A soluble base, such as preferably KOH, NaOH or mixtures of the two, can be used for this purpose. Preferably the pH correction is carried out at a low temperature (e.g., 5 to 15° C.) with efficient stirring in a sterile tank.

A third important element is the introduction in adequate proportions, of a separately sterilized fat phase in the form of a stable O/W emulsion with a near neutral pH into the sterile tank.

The calcium needed in the formula is introduced into the neutral phase following its homogenization and prior to its sterilization, either in form of insoluble calcium salts, which are preferably selected from the group consisting of tricalcium phosphate, calcium citrate and calcium carbonate, or in the form of a dispersible protein complex such as calcium caseinate or milk protein concentrate. Soluble minerals may also be introduced into the neutral phase prior to homogenization.

According to the invention, the combined phases that have been mixed in a sterile tank are then aseptically filled into TETRA BRIK® aseptic cartons, tins or other suitable packaging with an appropriate aseptic filling machine.

The filled, sterile product has a pH ranging from about 6.5 to 7.5, measured at ambient temperature. It is a stable product without any defects due to protein coagulation, sedimentation or gelling. It has good flow properties, shows no mineral sedimentation and has clean, bland taste. Due to its taste blandness and a neutral pH almost any flavor variant can be applied by the corresponding aroma or flavorant addition. The non-refrigerated shelf life of the product is at least several months, and is typically up to 6 months or longer after production.

EXAMPLES

The following Examples illustrate certain preferred embodiments of the invention for the purpose of illustrating the process disclosed herein and do not, in any way, limit the scope of the invention. In these Examples, the parts and percentages are by weight unless stated otherwise.

Example 1

High Protein Formula (80 g/l) Based on Whey Protein 26 kg of whey protein isolate (88% protein on total solids) together with 15 kg of sucrose and 15 kg of malto-dextrin (Dextrose Equivalent, DE=10–14) are dissolved in 150 kg of demineralized water. After complete dissolution, the pH of the solution is adjusted with $H_3PO_4$ (20%) to 3; the total weight of the protein/carbohydrate solution is adjusted to 250 kg by addition of water. The whey protein content of the acid phase is 9.2%, and its total solids content are 22.4%.

This solution is then UHT-heated on an indirect UHT plant. The preheating temperature is 80° C. and the sterilization temperature is 148° C., with a holding time of 5 s. After cooling of the product to 10° C., 217.5 kg of the product are pumped into a 500 kg double-walled sterile tank, fitted with an electrode and an aseptic dosing unit for base addition. While the product is kept at a temperature of 8-10° C., a mixture of 20% KOH/NaOH is pumped through a 0.1 micron sterile filter and the pH is rapidly raised from about 3 to 6.8 (at a temperature of about 10° C.). At this point, base dosing is stopped and the sterile product is kept at about 10° C. in the sterile tank.

To produce 50 kg of an O/W emulsion having a fat content of 23%, 11.5 kg of sunflower oil with 0.4 kg of lecithin dissolved in the oil, are emulsified with 30 kg of a 2% solution of sodium-caseinate.

Soluble minerals according to formula requirement are added and the pH is adjusted at a temperature of 60° C. to 6.8. The mixture is homogenized at 60° C. in a two stage homogenizer at 250 bar in the first stage and then at 50 bar in the second stage. Following homogenization, micronized calcium carbonate is dosed according to formula requirements. Trace elements and vitamins (not detailed) are introduced next, as well as a liquid aroma concentrate.

The O/W emulsion pH is adjusted to 6.7 (at a temperature of about 60° C.).

The completed fat phase is then UHT-sterilized by preheating at 80° C., high heating at 148° C. , holding for 5 s, flash-cooling to 70° C. and aseptically homogenizing at 150/30 bar. The sterilized emulsion is cooled to 10° C. on a plate heat exchanger and 32.5 kg of it are pumped into the sterile tank. The total weight of the combined phases is now 250 kg, the pH measured at 12° C. is 6.9. After stirring for about 15 min at about 12° C., the formula is pumped into an aseptic filling machine and filled into sterile aluminium tins, the latter which are hermetically sealed in a sterile environment.

The resulting liquid product has the following composition: protein: 82 g/kg; carbohydrates: 104 g/kg; and fat: 30 g/kg. The energy density is 1 kcal/g. Casein makes up 2% of the total protein, with 98% of the protein being whey protein. The product is stable for at least 6 months at ambient temperature and shows no sedimentation nor coagulation nor gelling. It has a clean taste and good flow properties.

Example 2

Whey Protein Based Tube-Feeding Formula at 1 kcal/g 14.28 kg of whey protein concentrate (80% protein on total solids) are completely dissolved in 125 kg demineralized water. 30 kg malto-dextrin and 7.14 kg of sucrose are then dissolved in the protein solution. Following the dissolution of the carbohydrates, the total weight of the solution is adjusted to 199 kg by adding demineralized water. The pH is then lowered to 3 with $H_3PO_4$ (20% concentration). The acid phase (200 kg) is pumped through the UHT-line: with preheating at 80° C. and high heating at 145° C. for 10 s.

The product is cooled on the plate exchanger to 10° C. and 140 kg of it are pumped into a sterile tank equipped with an aseptic dosing unit for base addition and a pH electrode. The pH of this protein/carbohydrate solution is raised to 6.8 by dosing a mixture of NaOH/KOH (20%) under rapid stirring.

100 kg of an O/W emulsion with 12.2% fat are next produced. In a fat mix composed of 8.54 kg medium chain triglycerides ($C_{6-10}$, MCT) and 3.66 kg sunflower oil, 0.5 kg of soy lecithin are dissolved at a temperature of 70° C. The oil mix is homogenized at 70° C. with 50 kg of a solution of Na-caseinate (1%). The pressure of the homogenizer valve is set to 250 bar (first stage) and 50 bar (second stage) and the neutral phase is homogenized at 70° C.

633.83 g (1.111 moles) of tri-calcium citrate. 4 $H_2O$ and 333.6 g (3.333 moles) of calcium carbonate, both salts micronized, are dispersed in an aqueous system and stabilized in a known manner. The dispersion is then added to the O/W emulsion and the whole mixture agitated at about 60° C. Further minerals, trace elements and vitamins (as required by formula targets) are added to the stirred emulsion as well as a strawberry flavor concentrate. Following adjustment of the total weight to 100 kg, the pH of the emulsion is raised with KOH to 6.8. After the pH adjustment, the O/W emulsion is heated in an UHT-plant: preheating at 80° C., high heating 145° C. for a holding time 10 s, followed by rapid cooling to 10° C.

60 kg of the sterilized emulsion are then pumped into the sterile tank, which contains already the neutralized protein phase. After another 15 min of stirring, the complete formula is pumped into a TETRA PAK® aseptic filling machine and filled into TETRA BRIK® aseptic cartons.

The packed product represents the following composition: total protein: 40 g/kg; fat: 36.6 g/kg; total carbohydrate: 130 g/kg; and total energy: 1 kcal/g. The calcium content is 800 mg/kg. The formula shows clean strawberry taste, has excellent flow properties and shows no sedimentation or fat separation. It is stable for >6 months at ambient temperature.

Example 3

Whey Protein Predominant Enteral Formula with ca 40% Protein From Casein and ca 60% Whey Protein; Energy Density 11.51 kcal/g For 200 kg of acid phase, 11.6 kg of whey protein isolate (88% protein on total solids) are dissolved in 120 kg demineralized water. After complete dissolution of the protein, 18 kg of maltodextrin (DE 10-14) and 32 kg of sucrose are dissolved in the protein solution. After complete dissolution of the carbohydrates, the total weight is adjusted to 199 kg with demineralized water. $H_3PO_4$ (20%) is added to adjust the pH to 3 at ambient temperature. The acid phase (200 kg) is heat sterilized by steam injection at 148° C. for 4 s and then cooled to 12° C.; 120 kg of it are then pumped into the sterile tank.

Soluble base (KOH/NaOH) is aseptically dosed via sterile filter into the tank to raise the pH to 6.8 (measurement at 12° C.).

The fat phase of the product is produced as follows. A dispersion of 9.036 kg of milk protein concentrate (83% protein on total solids) and 75 g of tri-K-citrate in demineralized water of 60° C. is made. A fat mix composed of 18.125 kg of a fat mix sunflower oil/corn oil/canola oil in a weight ratio 60/20/20 is made and, after warming the mix to 70° C., 0.3 kg of mono-diglycerides are dissolved in the fat. The fat mix is emulsified together with the protein dispersion using a colloidal mill. The total weight of the mix is adjusted to 100 kg by adding demineralised water and the resulting coarse emulsion is homogenized at 200 bar/40 bar at about 65° C. The resulting emulsion is now sterilized by direct steam injection at 148° C. for 5 s, flash-cooled to 70° C. and then aseptically homogenized at 150/30 bar pressure. The emulsion is cooled to ca 10° C. and 80 kg of it are pumped into the sterile tank where mixing with the 120 kg of protein/carbohydrate phase creates 200 kg of completed formula.

Soluble minerals and trace elements as well as vitamins (according to formula requirements) are aseptically introduced into the mix via the sterile filter.

After another 15 min of stirring in the tank, the sterile formula is filled aseptically into TETRA BRIK® aseptic cartons.

The filled product has the following characteristics: total protein 60 g/kg, of which about 40% is casein and 60% are whey proteins, mainly from whey protein isolate and to a lower part from the milk protein concentrate. The fat content is 73 g/kg and the total carbohydrate content 150 g/kg. This provides an energy density of about 1.5 kcal/g. Calcium content of the formula is 940 mg/kg, practically all the calcium is derived from milk protein concentrate. The formula has a bland taste and shows neither sediment nor any fat separation. Its pH at ambient temperature is 7. The product remains completely stable for up to 6 months at ambient temperature.

What is claimed is:

1. A sterile, shelf stable liquid nutritional composition having a protein content ranging from about 20 to 90 g/l and in which the proteins therein comprise at least 60% by weight whey protein in intact, unhydrolysed form, wherein the composition has a pH at ambient temperature of between 6 and 8.

2. The composition according to claim 1 having a protein content ranging from about 30 to 60 g/l.

3. The composition according to claim 1 which has a pH at ambient temperature of between 6.5 to 7.

4. The composition according to claim 1 which also contains calcium in a concentration between 300 and 1200 mg/l.

5. The composition according to claim 1 which also contains carbohydrates and emulsified dietetic oils and which has an energy density of between 1 and 2 kcal/ml.

6. The composition according to claim 1 wherein at least about 60% of the proteins therein are composed of whey protein in intact, unhydrolysed form.

7. The composition according to claim 1 wherein at least about 90% of the proteins therein are composed of whey protein in intact, unhydrolysed form.

8. A method for preparing an oral nutrition formulation which comprises including therein the shelf stable liquid nutritional composition of claim 1.

9. A method for preparing an enteral nutrition formulation which comprises including therein the shelf stable liquid nutritional composition of claim 1.

10. A method for providing nutrition to a patient which comprises administering to a patient in need of such nutrition a shelf stable ready-to-use composition according to claim 1.

11. The method of claim 10 wherein the composition is administered through a naso-gastric feeding tube.

12. The method of claim 10, wherein the composition is administered in an amount sufficient to provide complete nutritional support for the patient.

* * * * *